United States Patent
Ha

(10) Patent No.: US 6,617,371 B2
(45) Date of Patent: Sep. 9, 2003

(54) SINGLE COMPONENT ROOM TEMPERATURE STABLE HEAT-CURABLE ACRYLATE RESIN ADHESIVE

(75) Inventor: Chau Thi Minh Ha, Dearborn, MI (US)

(73) Assignee: Addison Clear Wave, LLC, Denver, CO (US)

( * ) Notice: Subject to any disclaimer, the term of this patent is extended or adjusted under 35 U.S.C. 154(b) by 0 days.

(21) Appl. No.: 09/878,620

(22) Filed: Jun. 8, 2001

(65) Prior Publication Data

US 2002/0198279 A1 Dec. 26, 2002

(51) Int. Cl.[7] .............................. C08F 2/46; C08F 2/50
(52) U.S. Cl. ...................... 522/60; 522/96; 522/100; 522/103; 522/104; 522/107; 522/74; 522/77; 522/79; 522/83; 522/24; 522/73; 522/61; 522/113; 522/121; 522/120; 522/182; 522/134; 522/142; 522/144; 427/508; 427/515; 427/516; 427/517; 427/518; 427/519; 428/345; 428/346; 428/347; 428/355 R; 428/355 PP; 428/355 AC; 428/355 N
(58) Field of Search ................... 522/96, 100, 103, 522/104, 107, 74, 77, 79, 83, 84, 24, 28, 60, 13; 427/508, 515, 516, 517, 518, 519; 428/345, 346, 347, 355 R, 355 EP, 355 AC, 355 N

(56) References Cited

U.S. PATENT DOCUMENTS

| | | | | |
|---|---|---|---|---|
| 4,309,334 A | * | 1/1982 | Valitsky | 521/54 |
| 4,374,963 A | | 2/1983 | Morgan et al. | 525/486 |
| 4,465,718 A | * | 8/1984 | Gruber | 252/182.18 |
| 4,533,446 A | * | 8/1985 | Conway et al. | 156/273.3 |
| 4,564,646 A | * | 1/1986 | Nishigaki et al. | 522/103 |
| 4,710,539 A | | 12/1987 | Siadat et al. | 525/59 |
| 4,816,495 A | * | 3/1989 | Blackwell et al. | 522/14 |
| 4,861,835 A | | 8/1989 | Maeda et al. | 525/200 |
| 4,975,498 A | | 12/1990 | Frihart | 252/420.5 |
| 5,001,168 A | * | 3/1991 | Fujii et al. | 522/107 |
| 5,063,269 A | * | 11/1991 | Hung | 428/425.6 |
| 5,178,710 A | | 1/1993 | Hikmet et al. | 156/272.2 |
| 5,250,591 A | * | 10/1993 | Fujii et al. | 522/117 |
| 5,506,051 A | | 4/1996 | Levy-Borochov et al. | |
| 5,739,180 A | | 4/1998 | Taylor-Smith | 523/203 |
| 5,807,906 A | | 9/1998 | Bonvallot et al. | 522/182 |
| 5,866,952 A | | 2/1999 | Wojnarowski et al. | 257/788 |
| 5,936,692 A | | 8/1999 | Van De Witte | 349/128 |
| 5,973,337 A | | 10/1999 | Knapp et al. | 257/99 |
| 6,086,795 A | * | 7/2000 | Hatton | 252/301.21 |
| 6,103,398 A | | 8/2000 | Norton et al. | 428/620 |
| 6,116,774 A | * | 9/2000 | Sasaki et al. | 156/334 |
| 6,284,087 B1 | * | 9/2001 | von Gutfeld et al. | 156/275.5 |

FOREIGN PATENT DOCUMENTS

| EP | 0330115 A2 | 8/1989 |
|---|---|---|
| EP | 0530402 A1 | 3/1993 |

OTHER PUBLICATIONS

International Search Report dated Oct. 14, 2002 (4 pages).

* cited by examiner

*Primary Examiner*—James J. Seidleck
*Assistant Examiner*—Sanza L. McClendon
(74) *Attorney, Agent, or Firm*—Marshall, Gerstein & Borun

(57) ABSTRACT

A single component liquid heat-curable adhesive formulation that is stable at room temperature. The formulation includes from about 5 to about 70 wt % of at least one acrylate monomer, from about 5 to about 94 wt % of an acrylate oligomer, and from about 0.1 to about 10 wt % of a thermal initiator selected from the group consisting of diacyl peroxides, benzoyl peroxides and peroxy esters. A photo initiator may be included thereby rendering the stable liquid formulation to be both heat-curable and UV-curable.

65 Claims, No Drawings

SINGLE COMPONENT ROOM TEMPERATURE STABLE HEAT-CURABLE ACRYLATE RESIN ADHESIVE

BACKGROUND OF THE INVENTION

The present invention relates generally to adhesives for flat panel displays and optoelectronics components. Still more specifically, the present invention relates to stable, thermally curable, single component acrylate resin adhesives for flat panel displays and optoelectronics components.

In the fields of flat panel displays and optoelectronics, a wide variety of adhesives and sealant formulations are used for bonding components together. Specifically, adhesives are used to bond large display elements together and for sealing edges in flat panel displays. Further, in optoelectronics components, various elements of laser diodes and dense wave division multiplexing assemblies are bonded together using adhesives. Typically, adhesives are either thermally curable (i.e., heat curable) or curable using ultraviolet light (UV-curable). Acrylate resins are currently available for use in adhesive applications. Currently available acrylate formulations are UV-curable. As they are effective adhesives for components of flat panel displays and optoelectronics devices, UV-curable acrylate adhesives are widely used. However, these adhesives cannot be employed to bond opaque components together. In order for any UV-curable adhesive to be used, at least one of the components needs to be transparent or semi-transparent. Thus, UV-curable acrylate adhesives cannot be used to bond ceramic parts, metallic parts or other opaque parts together. For these opaque parts, manufacturers are forced to use a thermally curable adhesive.

In the fields of flat panel displays and optoelectronics products, the currently available heat curable adhesives are epoxy materials. While epoxy materials are effective adhesives, they suffer from a number of disadvantages. First, thermally-curable epoxy materials are typically provided as two separate components and then mixed together prior to use. The mixed formulations have a short pot life, typically 4 to 8 hours after mixing. If the manufacturer cannot use all of the mixed thermally-curable epoxy material within the 4 to 8 hour time span, the material is wasted. Accordingly, considerable waste is associated with thermally-curable epoxy adhesives.

While single component (i.e., no need for mixing) thermally-curable epoxies are available, these materials are not room temperature stable. They must be shipped and stored at low temperatures in freezers. Thus, due to the difficulties in shipment and handling of these unstable materials, and further due to their instability at room temperature, the use of single component thermally-curable epoxy-based adhesives is not economical.

Finally, because many components of flat panel displays and optoelectronics devices are opaque and many are transparent, and further because manufacturers prefer to use UV-curable resins if possible, the assembly of many flat panel display devices and optoelectronics devices involve the use of at least two different adhesives, UV-curable and heat-curable. The two different adhesives often get confused on the assembly floor causing waste and other inefficiencies.

Accordingly, there is a need for an improved adhesive that can be provided as a single component liquid that is stable at room temperature and that is heat curable.

Further, there is a need for an improved adhesive that is a stable liquid at room temperature and further that can be either heat-cured or UV-cured.

SUMMARY OF THE DISCLOSURE

The present invention satisfies the aforenoted needs by providing a single component, i.e., liquid, heat-curable adhesive formulation that comprises from about 5 to about 70 wt % of at least one acrylate monomer, from about 5 to about 94 wt % of an acrylate oligomer, from about 0.1 to about 10 wt % of a thermal initiator selected from the group consisting of diacyl peroxides, benzoyl peroxides and peroxy esters. The above formulation of the present invention is a stable liquid at room temperature with a shelf life ranging from about one month to about one year or longer.

In a refinement of the invention, the thermal initiator is selected from the group consisting of lauroyl peroxide, benzoyl peroxide, decanoyl peroxide, di(n-propyl) peroxydicarbonate, di(sec-butyl)peroxydicarbonate, t-butyl peroxyneodecanoate, di-t-butyl peroxide, di-t-amyl peroxide, (t-butylperoxy)butyrate, t-butyl peroxybenzoate, and di-t-butyl peroxyoxalate. The thermal initiator may also be a hyponitrite, such as di-tert-butyl hyponitrite.

In a further refinement, the formulation further comprises a thickening agent.

In a further refinement, the formulation further comprises an acrylate cross-linking monomer. In a further refinement of this concept, the acrylate cross-linking monomer is selected from the group consisting of tris(2-hydroxy-ethyl) isocyanate triacrylate, neopentylglycol diacrylate, hexandiol diacrylate, triethyleneglycol dimethacrylate.

In another refinement, the formulation further comprises a cross-linkable adhesion promoter. In a further refinement of this concept, the adhesion promoter is selected from the group consisting of polyazarnide silane, aminoalkyl silane, gamma-mercaptopropyltrimethoxysilane, vinyltrimethoxysilane, methyltriethoxysilane, gamma-methacryloxypropyltrimethoxysilane, and bis-(3-[triethoxysilyl]propyl) tetrasulfane.

In yet another refinement, the adhesion promoter comprises a titanium salt or a zirconium salt.

In another refinement, the formulation further comprises an inhibitor.

In another refinement, the acrylate monomer is selected from the group consisting of isobornyl acrylate, phenoxyethyl acrylate, isoctyl acrylate, propoxylated allyl methacrylate and tetrahydrofurfuryl acrylate.

In yet another refinement, the at least one acrylate monomer comprises isobornyl acrylate and phenoxyethyl acrylate. In a further refinement of this concept, the isobornyl acrylate is present in an amount ranging from about 6 to about 10 wt %. In yet a further refinement, the isobornyl acrylate is present in an amount of about 8 wt %. In still another refinement, the phenoxyethyl acrylate is present in an amount ranging from about 12 to about 20 wt %. In yet a further refinement, the phenoxyethyl acrylate is present in amount of about 16 wt %.

In another refinement, the acrylate oligomer is polyurethane acrylate. In a further refinement of this concept, the polyurethane acrylate is present in an amount ranging from about 55 to about 75 wt %. In still a further refinement, polyurethane acrylate is present in an amount of about 66.6 wt %.

In another refinement, the thermal initiator is benzoyl peroxide which is present in an amount ranging from about 1 to about 5 wt %. In still a further refinement of this concept, the benzoyl peroxide is present in an amount of about 1.5 wt %.

In another refinement, the formulation comprises a photo initiator which enables the formulation to be either heat-cured or UV-cured. In a further refinement of this concept, the photo initiator is benzil dimethyl ketal which is present in an amount ranging from about 2 to about 4 wt %. In still a further refinement of this concept, the benzil dimethyl ketal is present in an amount of about 3 wt %.

In another refinement, a single component liquid heat-curable adhesive formulation is disclosed which comprises from about 6 to about 10 wt % isobornyl acrylate, from about 12 to about 20 wt % phenoxyethyl acrylate, from about 60 to about 70 wt % polyurethane acrylate, and from about 0.5 to about 2.5 wt % of a thermal initiator selected from the group consisting of diacyl peroxides, benzoyl peroxides and peroxy esters. The above formulation is a stable liquid at room temperature.

In still a further refinement, a single component liquid heat-curable adhesive formulation is disclosed which comprises from about 8 to about 12 wt % isooctyl acrylate from about 3 to about 7 wt % propoxylated allyl methacrylate, from about 70 to about 80 wt % polyester acrylate and from about 0.5 to about 2.5 t-butyl peroxybenzoate. In a further refinement of this concept, the formulation further comprises from about 6 to about 10 wt % neopentyl glycol diacrylate and from about 0.5 to about 1.5 gamma-aminopropyltriethoxysilane.

In another refinement, a single component liquid heat-curable adhesive formulation is disclosed which comprises from about 9 to about 13 wt % tetrahydrofurfuryl acrylate, from about 60 to about 70 wt % epoxy novolak acrylate and from about 0.5 to about 2.5 wt % lauroyl peroxide. In a further refinement of this formulation, the formulation further comprises about 10 to about 14 wt % neopentyl glycol diacrylate as a cross-linking agent, from about 8 to about 12 wt % triethylene glycol diacrylate as a cross-linking agent, from about 0.5 to about 1.5 wt % gamma-mercaptopropyltrimethoxysilane as an adhesion promoter and approximately 0.1 wt % 4-methoxyphenol as a stabilizer.

In yet another refinement, a single component liquid heat-curable adhesive formulation is disclosed which comprises from about 9 to about 13 wt % tetrahydrofurfuryl acrylate, from about 57 to about 67 wt % aromatic urethane acrylate and from about 1 to about 2 wt % di-t-butyl peroxyoxalate. In a further refinement of this formulation, the formulation may further comprise from about 10 to about 14 wt % hexandiol diacrylate as a cross-linking agent, from about 8 to about 12 wt % triethylene glycol dimethacrylate as cross-linking agent, from about 1 to about 3 wt % benzophenone and/or from about 1 to about 3 wt % triethylamine as photo initiators, from about 0.5 to about 1.5 wt % octyltriethoxysilane as an adhesion promoter and less than 1 wt % phenothiazine as a stabilizer.

Any of the above formulations may also include stabilizers selected from the group consisting of 4-methoxyphenol, butylated hydroxytoluene (2,6-di-t-butyl-4-methylphenol), phenothiazine, bistridecylthiodipropionate, and hindered amines.

In another refinement, a method of adhering a first component of a flat panel display to a second component of a flat panel display is disclosed. The method comprises providing a room temperature stable liquid heat-curable adhesive formulation that comprises from about 5 to about 70 wt % of at least one acrylate monomer, from about 5 to about 94 wt % of an acrylate oligomer, and from about 0.1 to about 10 wt % of a thermal initiator selected from the group consisting of diacyl peroxides, benzoyl peroxides and peroxy esters. The method further comprises applying the formulation to the first component, engaging the second component with the first component with the formulation disposed therebetween and heat-curing the formulation.

In yet another refinement, a method of adhering a first component of an optoelectronics device to a second component of an optoelectronics device is disclosed. The method comprises providing a room temperature stable liquid heat-curable adhesive formulation comprising from about 5 to about 70 wt % of at least one acrylate monomer, from about 5 to about 94 wt % of an acrylate oligomer and from about 0.1 to about 10 wt % of a thermal initiator selected from the group consisting of diacyl peroxides, benzoyl peroxides and peroxy esters. The method further includes the step of applying the formulation to the first component, engaging the second component to the first component with the formulation disposed therebetween and heat-curing the formulation.

DETAILED DESCRIPTION OF THE PRESENTLY PREFERRED EMBODIMENTS

The disclosed adhesive formulations are particularly useful in the flat panel display and optoelectronics industries because they can be used to glue opaque components together and/or one opaque component to a transparent component due to their ability to be heat-cured. The formulations disclosed below are stable liquids at room temperature. Hereinafter, "room temperature stable" will be used to refer to formulations that are stable at room temperature for a period of at least one month. The term "stable" means liquid formulations that do not gel or increase in viscosity to an extent that would adversely affect their use. One such formulation comprises from about 5 to about 70 wt % of at least one acrylate monomer, from about 5 to about 94 wt % of an acrylate oligomer and from about 0.1 to about 10 wt % of a thermal initiator selected from the group consisting of diacyl peroxides, benzoyl peroxides, peroxy esters and salts thereof.

One or more acrylate monomers can be used in the formulation. Suitable acrylate monomers includes isobornyl acrylate, phenoxyethyl acrylate, isooctyl acrylate, propoxylated allyl methacrylate and tetrahydrofurfuryl acrylate. Other acrylate monomers can be used as well and will be apparent to those skilled in the art. While the formulation can comprise from about 5 to about 70 wt % of an acrylate monomer, preferred formulations include lesser amounts, from about 10 to about 25 wt %.

Suitable acrylate oligomers include polyurethane acrylate, polyester acrylate, epoxy Novolak acrylate, and aromatic urethane acrylate. Other suitable acrylate oligomers can be utilized and will be apparent to those skilled in the art. While the formulation may include from about 5 to about 94 wt % acrylate oligomer, preferred formulation include from about 60 to about 80 wt %.

Suitable thermal initiators include lauroyl peroxide, benzoyl peroxide, decanoyl peroxide, di(n-propyl) peroxydicarbonate, di(sec-butyl)peroxydicarbonate, t-butyl peroxyneodecanoate, di-t-butyl peroxide, di-t-amyl peroxide, (t-butylperoxy)-butyrate, t-butyl peroxybenzoate, and di-t-butyl peroxyoxalate. The thermal initiator may also be a hyponitrite, such as di-tert-butyl hyponitrite. Other peroxide initiators will be apparent to those skilled in the art. While the thermal initiator may be present in an amount from about 0.1 to about 10 wt %, amounts in the range from about 0.5 to about 5 wt % have proven satisfactory.

It has also been found helpful to add an acrylate cross-linking agent to the formulation. Suitable acrylate cross-linking agents include tris(2-hydroxy-ethyl)isocyanate triacrylate, neopentyl glycol diacrylate, triethylene glycol dimethacrylate, and hexandiol diacrylate. Other cross-linking agents will be apparent to those skilled in the art. The acrylate cross-linking agents may be present in amount ranging from 0 to about 50 wt %. However, cross-linking agents in an amount ranging from 5% or less to about 25% have proven satisfactory.

The formulation may also include an adhesion promoter. Suitable adhesion promoters include, but are not limited to, polyazarnide silane, aminoalkyl silane, gamma-mercaptopropyltrimethoxysilane, vinyltrimethoxysilane, methyltriethoxysilane, gamma-methacryloxypropyltrimethoxysilane, bis-(3-[triethoxysilyl]propyl) tetrasulfane, gamma-aminopropyltriethoxysilane, gamma-mercaptopropyltrimethoxy silane and octyltriethoxysilane. Other adhesion promoters with be apparent to those skilled in the art. The adhesion promoter may be present in an amount ranging from about 0 to about 10 wt %.

The formulation may also include one or more stabilizers. Suitable stabilizers include, but are not limited to, 4-methoxyphenol, butylated hyrdorxytoluene (2,6-di-t-butyl-4-methylphenol), phenothiazine, bistridecylthiodipropionate, and hinder amines.

The formulation may be made by mixing the components, with no particular order being required. The formulations are stable liquids at room temperature and have a relatively long shelf live. Suitable formulations are illustrated by the following examples.

| Component | Weight % |
|---|---|
| EXAMPLE 1 | |
| isobornyl acrylate (acrylate monomer) | 8 |
| phenoxyethyl acrylate (acrylate monomer) | 16 |
| tris (2-hydroxy ethyl) isocyanurate triacrylate (cross-linking agent) | 5 |
| polyurethane acrylate (oligomer) | 66.5 |
| benzil dimethyl ketal (photo initiator) | 3 |
| benzoyl peroxide (thermal initiator) | 1.5 |
| EXAMPLE 2 | |
| neopentyl glycol diacrylate (cross-linking agent) | 8 |
| isooctyl acrylate (acrylate monomer) | 10 |
| propoxylated allyl methacrylate (monomer) | 5 |
| polyester acrylate (oligomer) | 74.5 |
| t-butyl peroxy benzoate (thermal initiator) | 1.5 |
| gamma-aminopropyltriethoxysilane (adhesion promoter) | 1.0 |
| EXAMPLE 3 | |
| neopentyl glycol diacrylate (cross-linking agent) | 12 |
| tetrahydrofurfuryl acrylate (acrylate monomer) | 11 |
| triethylene glycol dimethacrylate (cross-linking agent) | 10 |
| epoxy novolak acrylate (oligomer) | 64.4 |
| lauroyl peroxide (thermal initiator) | 1.5 |
| gamma-mercaptopropyltrimethoxysilane (adhesion promoter) | 1.0 |
| 4-methoxyphenol (stabilizer) | 0.1 |
| EXAMPLE 4 | |
| haxandiol diacrylate (cross-linking agent) | 12 |
| tetrahydrofurfuryl acrylate (acrylate monomer) | 11 |
| triethylene glycol dimethacrylate (cross-linking agent) | 10 |

| Component | Weight % |
|---|---|
| -continued | |
| aromatic urethane acrylate (oligomer) | 62.4 |
| di-t-butyl peroxyoxalate (thermal initiator) | 1.5 |
| bezophenone and triethylamine (photo initiator) | 2.0 |
| octyltriethoxysilane (adhesion promoter) | 1.0 |
| phenothiazine (stabilizer) | 0.1 |

The above exemplary formulations all have a shelf life at room temperature ranging from about one month to about one year. At a curing temperature ranging from about 50° C. to about 200° C., the above formulations having a drying time ranging from about 5 minutes to about ten hours.

Numerous modifications and variations in the practice of the invention are expected to occur to those skilled in the art upon consideration of the presently preferred embodiments disclosed herein. Consequently, the only limitations which would be placed upon the scope of the invention are those which appear in the appended claims.

What is claimed:

1. A single component liquid heat curable adhesive formulation comprising:
   from about 5 to about 70 wt % of at least one acrylate monomer comprising phenoxyethyl acrylate,
   from about 5 to about 94 wt % of an acrylate oligomer,
   from about 0.1 to about 10 wt % of a thermal initiator selected from the group consisting of diacyl peroxides, benzoyl peroxides, peroxy esters, hyponitrites and salts thereof, and
   and acrylate cross-linking monomer selected from the group consisting of tris(2-hydroxy-ethyl)isocyanate triacrylate, neopentyiglycol diacrylate, hexandiol diacrylate and triethyleneglycol dimethacrylate, wherein the formulation is a stable liquid at room temperature.

2. The formulation of claim 1 wherein the thermal initiator is selected from the group consisting of lauroyl peroxide, benzoyl peroxide, decanoyl peroxide, di(n-propyl) peroxydicarbonate, di(sec-butyl)peroxydicarbonate, t-butyl peroxyneodecanoate, di-t-butyl peroxide, di-t-amyl peroxide, (t-butylperoxy)butyrate, t-butyl peroxybenzoate and di-ti-butyl peroxyoxalate.

3. The formulation of claim 1 wherein the thermal initiator further comprises a hyponitrite.

4. The formulation of claim 3 wherein the hyponitrite is di-tert-butyl hyponitrite.

5. The formulation of claim 1 further comprising a thickening agent.

6. The formulation of claim 1 further comprising an adhesion promoter.

7. The formulation of claim 5 wherein the adhesion promoter is selected from the group consisting of polyazarnide silane, aminoalkyl silane, gamma-mercaptopropyltrimethoxysilane, vinyltrimethoxysilane, methyltriethoxysilane, gamma-methacryloxypropyltrimethoxysilane, bis-(3-[triethoxysilyl]propyl) tetrasulfane, gamma-aminopropyltriethoxysilane, gamma-mercaptopropyltrimethoxysilane and octyltriethoxysilane.

8. The formulation of claim 1 wherein the adhesion promoter comprises a titanium salt or a zirconium salt.

9. The formulation of claim 1 further comprising an inhibitor.

10. The formulation of claim 1 wherein the at least one acrylate monomer comprises an acrylate monomer selected from the group consisting of isobornyl acrylate, phenoxyethyl acrylate, isoctyl acrylate, propoxylated allyl methacrylate and tetrahydrofurfuryl acrylate.

11. The formulation of claim 10 wherein the at least one acrylate monomer comprises isobornyl acrylate is present in amount ranging from about 6 to about 10 wt %.

12. The formulation of claim 10 wherein the at least one acrylate monomer comprises isobornyl acrylate is present in amount of about 8 wt %.

13. The formulation of claim 12 wherein the phenoxyethyl acrylate is present in amount ranging from about 12 to about 20 wt %.

14. The formulation of claim 12 wherein the phenoxyethyl acrylate is present in amount of about 16 wt %.

15. The formulation of claim 1 wherein the acrylate oligomer is selected from the group consisting of polyurethane acrylate, polyester acrylate, epoxy novolak acrylate and aromatic urethane acrylate.

16. The formulation of claim 15 wherein acrylate oligomer is polyurethane acrylate which is present in an amount ranging from about 15 to about 75 wt %.

17. The formulation of claim 16 wherein the polyurethane acrylate is present in an amount of about 66.5 wt %.

18. The formulation of claim 1 wherein the thermal initiator is a diacyl peroxide which is present in an amount ranging from about 0.5 to about 10 wt %.

19. The formulation of claim 18 wherein the diacyl peroxide is present in an amount ranging from about 1 to about 5 wt %.

20. The formulation of claim 1 further comprising a photo initiator.

21. The formulation of claim 20 wherein the photo initiator is benzil dimethyl ketal which is present in an amount ranging from about 2 to about 10 wt %.

22. The formulation of claim 21 wherein the benzil dimethyl ketal is present in an amount of about 3 wt %.

23. A single component liquid heat curable adhesive formulation comprising:
    from about 6 to about 10 wt % isobornyl acrylate,
    from about 12 to about 20 wt % phenoxyethyl acrylate,
    from about 60 to about 70 wt % polyurethane acrylate,
    from about 0.5 to about 2.5 wt % of a thermal initiator selected from the group consisting of diacyl peroxides, benzoyl peroxides and peroxy esters,
    wherein the formulation is a stable liquid at room temperature.

24. The formulation of claim 23 wherein the thermal initiator is selected from the group consisting of lauroyl peroxide, benzoyl peroxide, decanoyl peroxide, di(n-propyl) peroxydicarbonate, di(sec-butyl)peroxydicarbonate, t-butyl peroxyneodecanoate, di-t-butyl peroxide, di-t-amyl peroxide, (t-butylperoxy)-butyrate and diacyl peroxides.

25. The formulation of claim 23 further comprising an acrylate cross linking monomer.

26. The formulation of claim 23 wherein the acrylate cross linking monomer is tris(2-hydroxy-ethyl)isocyanate triacrylate and is present in an amount ranging from about 3 to about 50 wt %.

27. The formulation of claim 23 further comprising a photo initiator.

28. The formulation of claim 27 wherein the photo initiator is benzil dimethyl ketal which is present in an amount ranging from about 1 to about 10 wt %.

29. A method of adhering a first component of a flat panel display to a second component of a flat panel display, the method comprising:
    providing a room temperature stable liquid heat curable adhesive formulation comprising from about 5 to about 70 wt % of at least one acrylate monomer comprising phenoxyethyl acrylate, from about 5 to about 94 wt % of an acrylate oligomer, an acrylate cross-linking monomer selected from the group consisting of tris(2-hydroxy-ethyl)isocyanate triacrylate, neopentylglycol diacrylate, hexandiol diacrylate and triethyleneglycol dimethacrylate, and from about 0.1 to about 10 wt % of a thermal initiator selected from the group consisting of diacyl peroxides, benzoyl peroxides, hyponitrites and peroxy esters;
    applying the formulation to the first component;
    engaging the second component with the first component with the formulation disposed therebetween;
    heat curing the formulation.

30. A method of adhering a first component of a optoelectronics device to a second component of the optoelectronics device, the method comprising:
    providing a room temperature stable liquid heat curable adhesive formulation comprising from about 5 to about 70 wt % of at least one acrylate monomer comprising phenoxyethyl acrylate, from about 5 to about 94 wt % of an acrylate oligomer, an acrylate cross-linking monomer selected from the group consisting of tris(2-hydroxy-ethyl)isocyanate triacrylate, neopentylglycol diacrylate, hexandiol diacrylate and triethyleneglycol dimethacrylate, and from about 0.1 to about 10 wt % of a thermal initiator selected from the group consisting of diacyl peroxides, benzoyl peroxides, hyponitrites and peroxy esters;
    applying the formulation to the first component;
    engaging the second component with the first component with the formulation disposed therebetween;
    heat curing the formulation.

31. A method of adhering a first component of a flat panel display to a second component of a flat panel display, the method comprising:
    providing a room temperature stable liquid heat curable adhesive formulation comprising from about 6 to about 10 wt % isobornyl acrylate, from about 12 to about 20 wt % phenoxyethyl acrylate, from about 60 to about 70 wt % polyurethane acrylate, and from about 0.5 to about 2.5 wt % of a thermal initiator selected from the group consisting of diacyl peroxides, benzoyl peroxides and peroxy esters;
    applying the formulation to the first component;
    engaging the second component with the first component with the formulation disposed therebetween;
    heat curing the formulation.

32. A method of adhering a first component of a optoelectronics device to a second component of the optoelectronics device, the method comprising:
    providing a room temperature stable liquid heat curable adhesive formulation comprising from about 6 to about 10 wt % isobornyl acrylate, from about 12 to about 20 wt % phenoxyethyl acrylate, from about 60 to about 70 wt % polyurethane acrylate, and from about 0.5 to about 2.5 wt % of a thermal initiator selected from the group consisting of diacyl peroxides, benzoyl peroxides and peroxy esters;
    applying the formulation to the first component;
    engaging the second component with the first component with the formulation disposed therebetween;
    heat curing the formulation.

33. A single component liquid heat curable adhesive formulation comprising:
   from about 5 to about 70 wt % of at least one acrylate monomer comprising phenoxyethyl acrylate,
   from about 5 to about 94 wt % of an acrylate oligomer,
   from about 0.1 to about 10 wt % of a thermal initiator comprising a hyponitrite and another material selected from the group consisting of diacyl peroxides, benzoyl peroxides, peroxy esters and salts thereof,
   from about 0.1 to about 10 wt % of a photo initiator,
   wherein the formulation is a stable liquid at room temperature.

34. A single component liquid heat curable adhesive formulation comprising:
   from about 5 to about 70 wt % of at least one acrylate monomer,
   from about 5 to about 94 wt % of an acrylate oligomer,
   from about 0.1 to about 10 wt % of a thermal initiator comprising at least one hyponitrite,
   wherein the formulation is a stable liquid at room temperature.

35. The formulation of claim 34 wherein the hyponitrite is di-tert-butyl hyponitrite.

36. The formulation of claim 34 further comprising an acrylate cross linking monomer.

37. The formulation of claim 36 wherein the acrylate cross linking monomer is selected from the group consisting of tris(2-hydroxy-ethyl)isocyanate triacrylate, neopentylglycol diacrylate, hexandiol diacrylate and triethyleneglycol dimethacrylate.

38. The formulation of claim 34 further comprising an adhesion promoter.

39. The formulation of claim 38 wherein the adhesion promoter comprises a titanium salt or a zirconium salt.

40. The formulation of claim 38 wherein the at least one acrylate monomer further comprises an acrylate monomer selected from the group consisting of isobornyl acrylate, phenoxyethyl acrylate, isoctyl acrylate, propoxylated allyl methacrylate and tetrahydrofurfuryl acrylate.

41. The formulation of claim 10 wherein the at least one acrylate monomer comprises phenoxyethyl acrylate is present in amount ranging from about 12 to about 20 wt %.

42. The formulation of claim 34 further comprising a photo initiator.

43. The formulation of claim 42 wherein the photo initiator is benzil dimethyl ketal which is present in an amount ranging from about 2 to about 10 wt %.

44. The formulation of claim 43 wherein the benzil dimethyl ketal is present in an amount of about 3 wt %.

45. A method of adhering a first component of a flat panel display to a second component of a flat panel display, the method comprising:
   providing a room temperature stable liquid heat curable adhesive formulation comprising from about 5 to about 70 wt % of at least one acrylate monomer, from about 5 to about 94 wt % of an acrylate oligomer, and from about 0.1 to about 10 wt % of a thermal initiator comprising a hyponitrite;
   applying the formulation to the first component;
   engaging the second component with the first component with the formulation disposed therebetween;
   heat curing the formulation.

46. A method of adhering a first component of a optoelectronics device to a second component of the optoelectronics device, the method comprising:
   providing a room temperature stable liquid heat curable adhesive formulation comprising from about 5 to about 70 wt % of at least one acrylate monomer, from about 5 to about 94 wt % of an acrylate oligomer, and from about 0.1 to about 10 wt % of a thermal initiator comprising a hyponitrite;
   applying the formulation to the first component;
   engaging the second component with the first component with the formulation disposed therebetween;
   heat curing the formulation.

47. A single component liquid heat curable adhesive formulation comprising:
   from about 5 to about 70 wt % of at least one acrylate monomer,
   from about 5 to about 94 wt % of an acrylate oligomer,
   from about 0.1 to about 10 wt % of a thermal initiator comprising a hyponitrite,
   from about 0.1 to about 10 wt % of a photo initiator,
   wherein the formulation is a stable liquid at room temperature.

48. A single component liquid heat curable adhesive formulation comprising:
   from about 5 to about 70 wt % of at least one acrylate monomer,
   from about 5 to about 94 wt % of an acrylate oligomer,
   from about 0.1 to about 10 wt % of a thermal initiator selected from the group consisting of diacyl peroxides, benzoyl peroxides, peroxy esters and salts thereof, and
   an adhesion promoter comprising a titanium salt or a zirconium salt,
   wherein the formulation is a stable liquid at room temperature.

49. The formulation of claim 48 wherein the thermal initiator is selected from the group consisting of lauroyl peroxide, benzoyl peroxide, decanoyl peroxide, di(n-propyl) peroxydicarbonate, di(sec-butyl)peroxydicarbonate, t-butyl peroxyneodecanoate, di-t-butyl peroxide, di-t-amyl peroxide, (t-butylperoxy)-butyrate, t-butyl peroxybenzoate and di-ti-butyl peroxyoxalate.

50. The formulation of claim 48 wherein the thermal initiator further comprises a hyponitrite.

51. The formulation of claim 50 wherein the hyponitrite is di-tert-butyl hyponitrite.

52. The formulation of claim 48 further comprising an acrylate cross linking monomer.

53. The formulation of claim 48 wherein the acrylate cross linking monomer is selected from the group consisting of tris(2-hydroxy-ethyl)isocyanate triacrylate, neopentyiglycol diacrylate, hexandiol diacrylate and triethyleneglycol dimethacrylate.

54. The formulation of claim 48 wherein the at least one acrylate monomer comprises an acrylate monomer selected from the group consisting of isobornyl acrylate, phenoxyethyl acrylate, isoctyl acrylate, propoxylated methacrylate and tetrahydrofurfuryl acrylate.

55. The formulation of claim 54 wherein the at least one acrylate monomer comprises phenoxyethyl acrylate is present in amount ranging from about 12 to about 20 wt %.

56. The formulation of claim 55 wherein the at least one acrylate monomer comprises phenoxyethyl acrylate is present in amount of about 16 wt %.

57. The formulation of claim 48 wherein the acrylate oligomer is selected from the group consisting of polyurethane acrylate, polyester acrylate, epoxy novolak acrylate and aromatic urethane acrylate.

58. The formulation of claim 57 wherein acrylate oligomer is polyurethane acrylate which is present in an amount ranging from about 15 to about 75 wt %.

59. The formulation of claim 48 wherein the thermal initiator is a diacyl peroxide which is present in an amount ranging from about 0.5 to about 10 wt %.

60. The formulation of claim 59 wherein the diacyl peroxide is present in an amount ranging from about 1 to about 5 wt %.

61. The formulation of claim 48 further comprising a photo initiator.

62. The formulation of claim 61 wherein the photo initiator is benzil dimethyl ketal which is present in an amount ranging from about 2 to about 10 wt %.

63. A method of adhering a first component of a flat panel display to a second component of a flat panel display, the method comprising:

providing a room temperature stable liquid heat curable adhesive formulation comprising from about 5 to about 70 wt % of at least one acrylate monomer, from about 5 to about 94 wt % of an acrylate oligomer, from about 0.1 to about 10 wt % of a thermal initiator selected from the group consisting of diacyl peroxides, benzoyl peroxides, peroxy esters and hyponitrites, and an adhesion promoter that is a titanium salt or a zirconium salt;

applying the formulation to the first component;

engaging the second component with the first component with the formulation disposed therebetween;

heat curing the formulation.

64. A method of adhering a first component of a optoelectronics device to a second component of the optoelectronics device, the method comprising:

providing a room temperature stable liquid heat curable adhesive formulation comprising from about 5 to about 70 wt % of at least one acrylate monomer, from about 5 to about 94 wt % of an acrylate oligomer, from about 0.1 to about 10 wt % of a thermal initiator selected from the group consisting of diacyl peroxides, benzoyl peroxides, peroxy esters and hyponitrites, and an adhesion promoter that is a titanium salt or a zirconium salt;

applying the formulation to the first component;

engaging the second component with the first component with the formulation disposed therebetween;

heat curing the formulation.

65. A single component liquid heat curable adhesive formulation comprising:

from about 5 to about 70 wt % of at least one acrylate monomer, from about 5 to about 94 wt % of an acrylate oligomer, from about 0.1 to about 10 wt % of a thermal initiator selected from the group consisting of diacyl peroxides, benzoyl peroxides, peroxy esters and salts thereof from about 0.1 to about 10 wt % of a photo initiator, and an adhesion promoter that comprises at least one of a zirconium salt or a titanium salt, wherein the formulation is a stable liquid at room temperature.

* * * * *

UNITED STATES PATENT AND TRADEMARK OFFICE
CERTIFICATE OF CORRECTION

PATENT NO. : 6,617,371 B2
DATED : September 9, 2003
INVENTOR(S) : Chau Thi Minh Ha It is certified that error appears in the above-identified patent and that said Letters Patent is hereby corrected as shown below:

Column 6,
Line 35, please delete "and acrylate" and insert -- and an acrylate -- in its place.
Line 37, please delete "neopentyiglycol" and insert -- neopentylglycol -- in its place.

Column 7,
Line 51, after "peroxide," please delete "(t-butylperoxy)-butyrate" and insert
-- (t-butylperoxy)butyrate -- in its place.

Column 10,
Lines 47-48, after "triacrylate," please delete "neonpentiglycol" and insert
-- neopentylglycol -- in its place.
Line 53, after "isoctyl acrylate," please delete "propoxylated methacrylate" and insert
-- propoxylated allyl methacrylate -- in its place.

Column 12,
Line 21, after "salts," please delete "thereof" and insert -- thereof, -- in its place.

Signed and Sealed this

First Day of June, 2004

JON W. DUDAS
*Acting Director of the United States Patent and Trademark Office*